No. 776,462. PATENTED NOV. 29, 1904.
C. H. GARRISON & R. & J. VAN DER WEIT.
REMOVABLE RUNNER FOR CARRIAGE OR WAGON WHEELS.
APPLICATION FILED FEB. 26, 1904.
NO MODEL.
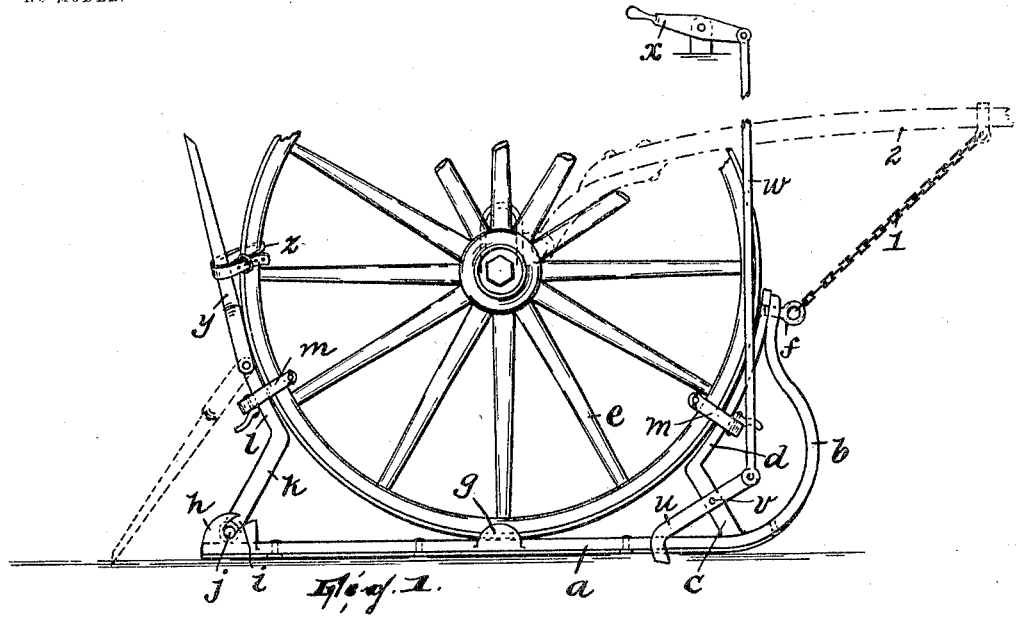
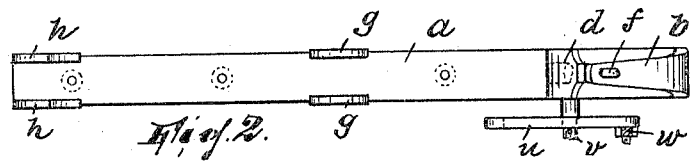
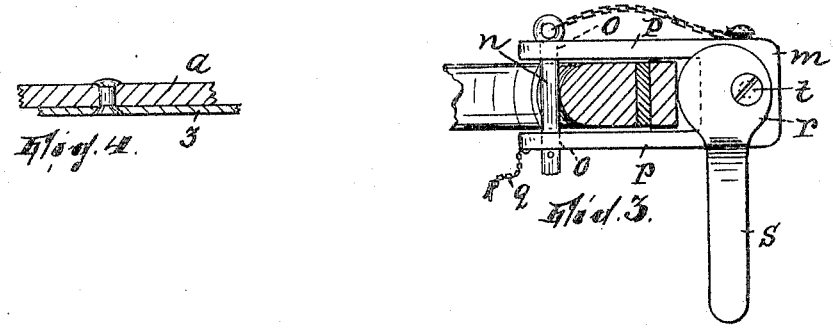
WITNESSES:
W. D. Bell
Robert J. Pollitt
INVENTORS,
Charles H. Garrison,
Richard Van der Weit,
and James Van der Weit,
BY
Gartner & Seward,
ATTORNEYS.

No. 776,462. Patented November 29, 1904.

UNITED STATES PATENT OFFICE.

CHARLES H. GARRISON, RICHARD VAN DER WEIT, AND JAMES VAN DER WEIT, OF DUNDEE LAKE, NEW JERSEY.

REMOVABLE RUNNER FOR CARRIAGE OR WAGON WHEELS.

SPECIFICATION forming part of Letters Patent No. 776,462, dated November 29, 1904.

Application filed February 26, 1904. Serial No. 195,422. (No model.)

*To all whom it may concern:*

Be it known that we, CHARLES H. GARRISON and RICHARD VAN DER WEIT, citizens of the United States, and JAMES VAN DER WEIT, a subject of the Queen of the Netherlands, residing in Dundee Lake, in the county of Bergen and State of New Jersey, have invented certain new and useful Improvements in Removable Sleigh-Runners for Carriage or Wagon Wheels; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates to removable sleigh-runners for wheeled vehicles; and it consists in certain improvements in devices of this nature having principally in view to simplify and cheapen the construction, accommodate wheels of varying diameters, and provide for braking and chocking on grades.

Our invention will be found fully illustrated in the accompanying drawings, wherein—

Figure 1 shows the device in position on one of the front wheels of a vehicle. Fig. 2 is a top plan view of the device with the rear stop and the attached chocking-piece removed. Fig. 3 is an enlarged detail view taken as a section through the parts shown in Fig. 1 and just above one of the clamps therein shown, and Fig. 4 is a detail view of the runner of the device.

In said drawings, $a$ is the runner, the same being turned up at the front end, as at $b$, and formed with a preferably integral upright $c$, having an arc-shaped portion $d$, designed to conform approximately to the periphery of the wheel $e$. The turned-up portion $b$ of the runner and the upper extremity of the upright $c$ are secured together, as by a riveted eyelet-pin $f$, and thus not only brace each other, but together constitute the front stop of the runner.

$g$ $g$ are lugs which project upwardly from each side of the runner $a$ near the middle thereof and form therewith a socket or rest for the wheel $e$. $h$ $h$ are other lugs having rearwardly-inclined recesses $i$ and being preferably spaced about the same as the lugs $g$ $g$. The recesses $i$ receive the trunnions $j$ of a rear stop $k$, which is thus pivoted in the lugs. Its free end $l$ may be arc-shaped, so as to thus conform to the periphery of the wheel. The arrangement is such that the stop $k$ may be removed from the runner, and since the lugs $h$ are spaced greater than the width of the tread of the wheel the parts can be either attached or detached from the wheel by simply sliding the runner in or out from under the wheel.

$m$ designates U-shaped clips adapted to secure the wheel and each stop together. Each of these clips has a removable pin $n$, which is introduced through holes $o$ in the arms $p$ of the clip after the clip has been attached, as shown in Fig. 3. A cotter-pin $q$ may be provided to keep the pin $n$ at this time in place.

$r$ is a cam having a handle $s$ and arranged on a pivot $t$, disposed at the end of the clip remote from pin $n$. When the clip has been attached, the cam is turned into the position shown in Fig. 3, so that the stop and the felly of the wheel are securely clamped together thereby.

As a brake or drag we provide a spur $u$, pivoted at $v$ in the upright $c$ and adapted to be connected by a pitman $w$ with an operating-lever $x$.

The rear stop $k$ may have pivoted thereto at its free end a chock $y$, which when in use stands in the dotted-line position shown in Fig. 1 and when out of use may be held up against the periphery of the wheel by a strap $z$.

It will be understood that one or more of the set of runners for a vehicle may have the braking and chocking devices, but not necessarily all of them.

The runner $a$ is preferably made long enough so that under ordinary conditions it will not "trip"—*i. e*, turn up at its rear end when meeting with some obstacle in the road; but in order to insure against this happening under any condition a chain 1 may be provided to connect the eyelet-pin $f$ with some part of the vehicle, as the shaft 2.

The runner $a$ is preferably provided with a removable shoe 3, which may be replaced by a new one when worn out.

Having thus fully described our invention, what we claim, and desire to secure by Letters Patent, is—

1. The combination of a runner having a wheel-stop at each end thereof, one of which is pivotally mounted, spaced lugs forming the mountings for the pivoted stop, and means for securing each stop to the wheel, substantially as described.

2. The combination of a runner, wheel-stops disposed one at each end of said runner, a U-shaped clip embracing a portion of each wheel-stop, a pin traversing the opening in each clip which receives the wheel-stop, and a cam carried by said clip and adapted to coact with said pin to clamp said stop to the wheel, substantially as described.

3. The combination of a runner having a wheel-stop at each end thereof, the rear one of which is pivotally mounted, spaced lugs forming the mountings for the pivoted stop, means for securing each stop to the wheel, and a chocking-piece pivotally connected to the pivoted stop, substantially as described.

In testimony that we claim the foregoing we have hereunto set our hands this 17th day of February, 1904.

CHARLES H. GARRISON.
  RICHARD VAN DER WEIT.
  JAMES VAN DER WEIT.

Witnesses:
 ALFRED GARTNER,
 JOHN W. STEWARD.